United States Patent [19]

McKenna

[11] Patent Number: 4,971,459
[45] Date of Patent: Nov. 20, 1990

[54] JOURNAL BEARING WITH HIGH STIFFNESS

[75] Inventor: John M. McKenna, Port Murray, N.J.

[73] Assignee: Ingersoll-Rand Company, Woodcliff Lake, N.J.

[21] Appl. No.: 497,660

[22] Filed: Mar. 23, 1990

[51] Int. Cl.$^5$ .......................................... F16C 17/02
[52] U.S. Cl. .................................. 384/286; 384/397
[58] Field of Search .............. 384/118, 114, 286, 397, 384/255, 447

[56] References Cited

U.S. PATENT DOCUMENTS

| | | |
|---|---|---|
| 2,634,176 | 4/1953 | Gerard . |
| 3,053,589 | 9/1962 | Cameron . |
| 3,201,183 | 8/1965 | Buske . |
| 3,582,159 | 6/1971 | Uhtenwoldt . |
| 3,639,014 | 2/1972 | Sixsmith . |
| 4,624,584 | 11/1986 | Odermatt . |
| 4,685,813 | 8/1987 | Moog ................................. 384/118 |
| 4,747,705 | 5/1988 | Agrawal ............................ 384/118 |

Primary Examiner—Lenard A. Footland
Attorney, Agent, or Firm—D. W. Tibbott

[57] ABSTRACT

A bearing arrangement wherein a shaft of uniform diameter is supported in a journal bearing having multiple sections located axially along said shaft at different locations. Each journal bearing section includes a circular journal bore receiving the shaft with the axis of said journal bores being parallel and displaced relative to each other and to the axis of the enclosed shaft in a plane normal to the axis of the shaft.

4 Claims, 2 Drawing Sheets

JOURNAL BEARING WITH HIGH STIFFNESS

BACKGROUND OF THE INVENTION

This invention relates generally to bearings and more particularly to journal bearings wherein a cylindrical shaft rotates in a journal sleeve with an oil film supporting and separating the shaft surface from the journal surface to protect the two surfaces against destroying each other.

Normally journal bearings include a cylindrical shaft rotating in an annular bearing sleeve having a circular bore with a diameter that is slightly larger than the diameter of the shaft in order to provide an operating clearance for the bearing. An oil film exists in this clearance to support the shaft and prevent it from engaging the surface of the bearing sleeve. Usually the shaft is not located exactly along the axis of the bearing sleeve but is displaced from such axis slightly so that it rotates about an axis that is eccentric to the bearing sleeve axis. Designers of machinery would like to reduce the clearance between the shaft and the bearing sleeve to a minimum so that the bearing has a high stiffness, i.e. zero play. However, the reduction of the clearance unduly causes the bearing to self-destruct and therefore all bearings of this type need a substantial clearance to operate properly. The play in the bearing determines its stiffness and bearings of the aforementioned type have relatively low stiffness because of having substantial play therein.

U.S. Pat. No. 4,624,584, issued Nov. 25, 1986, describes several variations of journal type bearings which are attempts to design journal bearings having higher stiffness. There prior art designs still have substantial play.

The foregoing describes limitations known to exist in present-day journal bearings. Thus, it is apparent that it would be advantageous to provide an alternative directed to overcoming one or more of the limitations set forth above. Accordingly, a suitable alternative is provided in the invention disclosed hereinafter.

SUMMARY OF THE INVENTION

In one aspect of the present invention, these goals are accomplished by providing a journal bearing arrangement having a rotating shaft mounted in a journal sleeve having multiple sections located axially along the sleeve relative to each other with each section including a journal bore receiving the shaft and with the axes of said journal bores being parallel and displaced normally from each other so that the said bores are eccentric to each other. In this way the shaft rotates in multiple eccentric bores. The adjustment of the eccentricity of the bores can result in the bores acting together to support the shaft with very little play while each bore is sufficiently larger than the shaft to provide enough clearance for the proper oil film to be formed in the bores for supporting the shaft while preventing it from engaging the surface of the journal bores causing damage.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
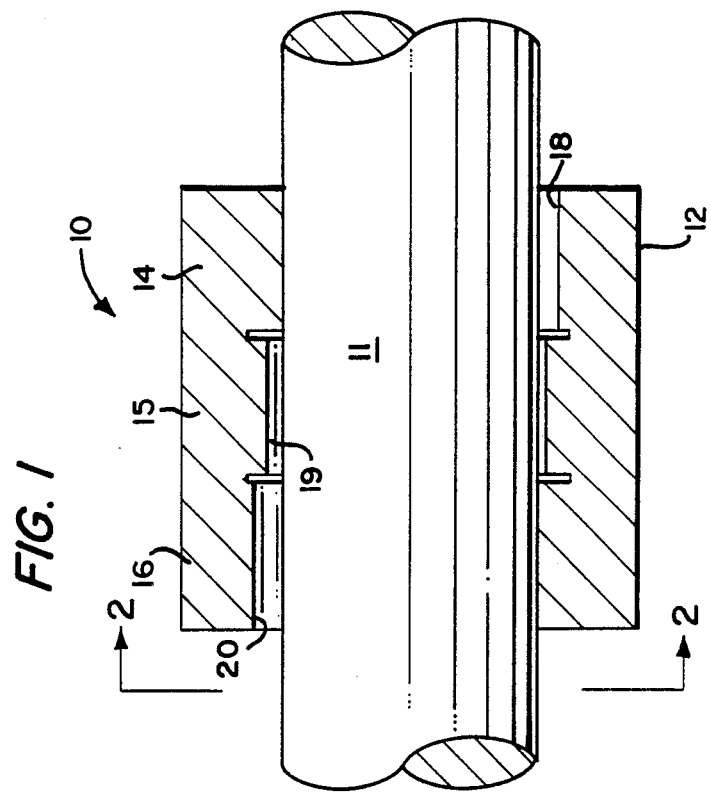
FIG. 1 is an axial section of a journal bearing arrangement taken on line 1—1 in FIG. 2 in accordance with this invention.
Figure 2:
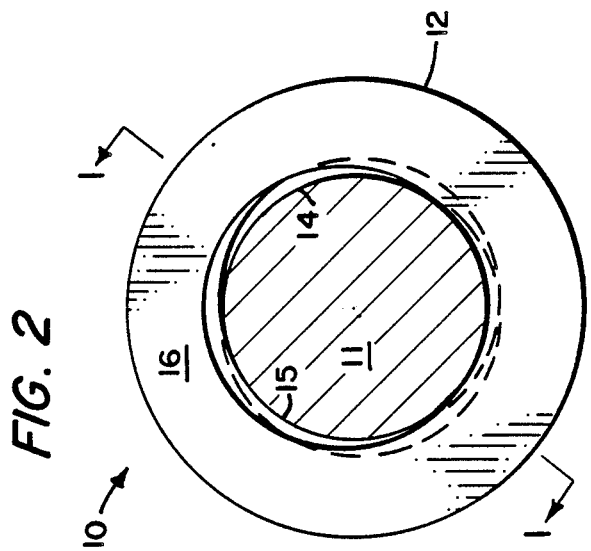
FIG. 2 is a cross-section taken on line 2—2 in FIG. 1.

The bearing arrangement 10 in FIG. 1 includes a shaft 11 encircled by a bearing shell 12 having three sections located axially along the shell. The three bearing sections are designated 14, 15 and 16 and each has a respective journal bore designated 18, 19 and 20 in the same order. Each of the journal bores 18 to 20 are located eccentric to each other with the diametrical line of each bore that passes through the axis of the shaft 11 located at 120 degree intervals relative to each of the other bores. EAch of the bores 18 to 20 are larger than the diameter of the shaft 11 resulting in an arrangement wherein the shaft 11 rides on an arcuate portion of each of the bores. In each bore the arcuate portion engaging the shaft 11 lies on a diametrical line passing through the axis of the shaft and the axis of the bore with the axis of the shaft being located nearer to the engaging portion of the bore than the bore axis. In this way the shaft is supported between all three bores with each bore having a portion which is spaced substantially from the shaft surface.

Figure 3:
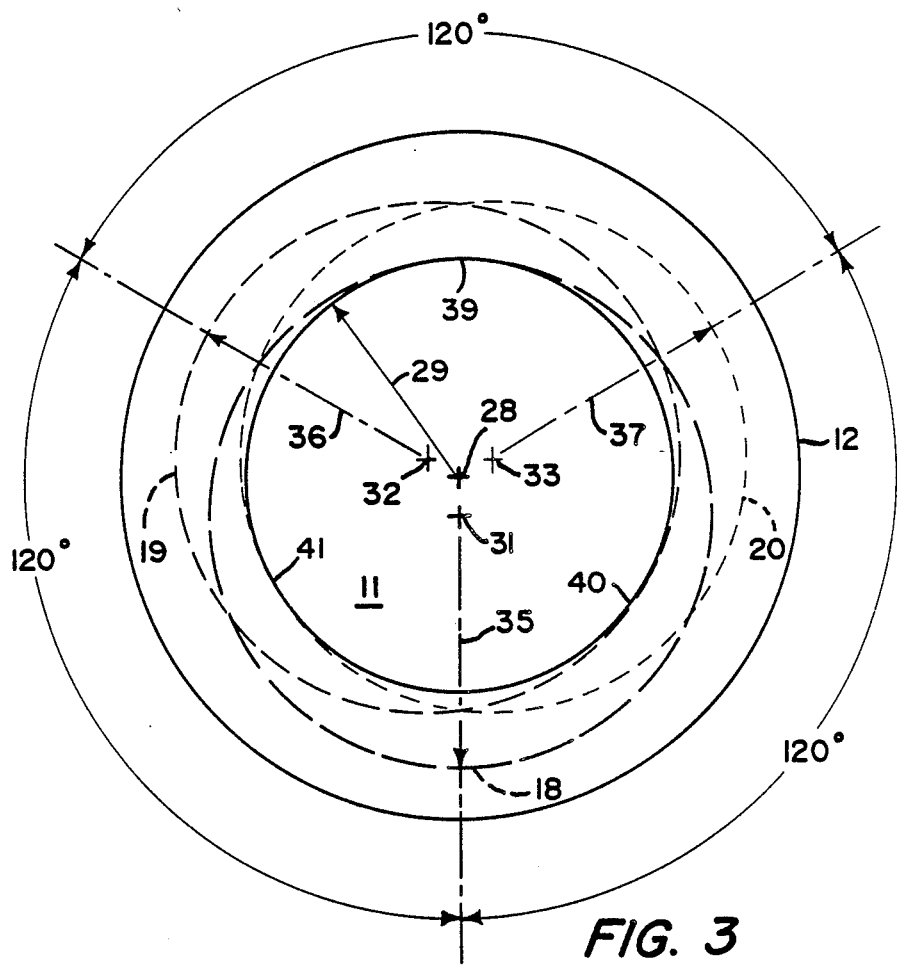
FIG. 3 is an enlarged diagrammatic representation of the invention viewing the bearing from the same position as in FIG. 2.

The bearing arrangement 10 is further described in connection with FIG. 3 wherein the spacing between the bores 18 to 20 and the shaft 11 is substantially increased from what is would be in an actual bearing in order to better show graphically the nature of the invention. In FIG. 3 the axis of the shaft 11 is designated 28 and has a radius 29. Each of the bores 18, 19 and 20 have a corresponding axis 31, 32 and 33 with each axis spaced from the shaft axis 28 and located on an imaginary circle having an axis 28 at 120 degree intervals from each other.

The radii of each of the bores 18, 19 and 20 are designated 35, 36 and 37. The periphery of the shaft 11 engages an arcuate section of each of the bores at a point located on a line passing through both the axis of the bore and the axis 28 of the shaft and where the shaft axis 28 is the nearest to the bore periphery. For example, in FIG. 3 you will see that the bores 18, 19 and 20, respectively, engage the shaft periphery at the arcs designated as 39, 40 and 41. In this way the shaft 11 is cradled by three separate arcs 39, 40 and 41 serving as bearing surfaces for the shaft 11 with the remainder of the bores other than these particular arcs being spaced from the shaft 11 which prevents any of the bores from being too tight for the shaft 11 as well as allowing the lubricant to built up as wedges for proper lubrication of the shaft 11 during operation.

This invention enables the bearing arrangement to be made with a high stiffness which means that the shaft operates with very low clearance in the bearing without risk of failure.

An example of the invention could contain the following dimensions.

| | |
|---|---|
| diameter of shaft 11 | 2.000" |
| diameter of each bore 18-20 | 2.006" |
| offset of each bore axis 31-33 from shaft axis 28 | .002" |

The foregoing dimensions will give a 0.001" clearance between the shaft 11 and each bore at the arcs 39-41.

Normally, a clearance of only 0.001" in a conventional bearing would be too low for high speed. It is believed that this invention will allow a shaft to operate successfully in a low clearance situation such as in the foregoing example.

Another advantage of this invention is the fact that less heat is created in this bearing as compared to a conventional bearing having the same clearance. This is because each bore 18-20 has a much greater clearance than the overall bearing clearance.

While this invention has been illustrated and described in accordance with a preferred embodiment it is recognized that variations and changes may be made therein without departing from the invention as set forth in the claims.

Having described the invention, what is claimed is:

1. A journal bearing arrangement comprising: a shaft having a given shaft diameter; a journal bearing supporting said shaft and including at least two sections located axially relative to each other with each section including a circular journal bore receiving said shaft and with the axes of said journal bores being parallel and displaced from each other so that said bores are eccentric to each other.

2. The journal bearing arrangement of claim 1 wherein: said shaft is supported in operation by a portion of the periphery of each journal bore with the shaft supporting portion of the peripheries of each journal bore being displaced from each other angularly around the periphery of the shaft.

3. The journal bearing arrangement of claim 2 wherein: said journal bearing includes at least three sections having parallel axes which are displaced from each other whereby said bores are eccentric to each other.

4. The journal bearing arrangement of claim 3 wherein: each of said journal bearing sections is displaced eccentrically relative to said shaft at approximately equal angles around said shaft.

* * * * *